US006625594B1

(12) United States Patent
Rolland et al.

(10) Patent No.: US 6,625,594 B1
(45) Date of Patent: Sep. 23, 2003

(54) SYSTEM AND METHOD FOR SEARCHING A GLOBAL COMMUNICATION SYSTEM USING A SUB-ROOT DOMAIN NAME AGENT

(75) Inventors: Steven C. Rolland, Colville, WA (US); Stephen W. Oachs, Spokane, WA (US)

(73) Assignee: With1Click, Inc., Spokane, WA (US)

( * ) Notice: Subject to any disclaimer, the term of this patent is extended or adjusted under 35 U.S.C. 154(b) by 0 days.

(21) Appl. No.: 09/484,598

(22) Filed: Jan. 18, 2000

(51) Int. Cl.$^7$ ................................................ G06F 17/30
(52) U.S. Cl. ............................ 707/3; 707/10; 709/218
(58) Field of Search .................. 707/1–4, 10, 100, 707/102; 709/203, 217–219

(56) References Cited

U.S. PATENT DOCUMENTS

| | | | | |
|---|---|---|---|---|
| 5,506,984 A | * | 4/1996 | Miller ........................... | 707/10 |
| 5,515,531 A | * | 5/1996 | Fujiwara et al. ................ | 707/3 |
| 5,634,051 A | * | 5/1997 | Thomson ........................ | 707/5 |
| 5,764,906 A | | 6/1998 | Edelstein et al. ....... | 395/200.49 |
| 5,794,233 A | | 8/1998 | Rubinstein ..................... | 707/4 |
| 5,806,065 A | * | 9/1998 | Lomet ........................... | 707/3 |
| 5,819,255 A | | 10/1998 | Celis et al. .................... | 707/2 |
| 5,826,254 A | * | 10/1998 | Kahn ............................. | 707/5 |
| 5,848,410 A | * | 12/1998 | Walls et al. ................. | 707/102 |
| 5,913,208 A | | 6/1999 | Brown et al. ................... | 707/3 |
| 5,918,227 A | * | 6/1999 | Polnerow et al. ............... | 707/1 |
| 5,935,187 A | | 8/1999 | Trsar et al. ................. | 701/102 |
| 5,937,392 A | * | 8/1999 | Alberts ......................... | 705/14 |
| 5,941,944 A | * | 8/1999 | Messerly ....................... | 707/3 |
| 5,961,602 A | | 10/1999 | Thompson et al. ......... | 709/229 |
| 5,978,817 A | | 11/1999 | Giannandrea et al. ...... | 707/501 |
| 5,983,223 A | | 11/1999 | Perlman ........................ | 707/6 |
| 5,991,756 A | | 11/1999 | Wu .............................. | 707/3 |
| 5,991,762 A | | 11/1999 | Nagarajayya et al. ........ | 707/100 |
| 5,995,956 A | | 11/1999 | Nguyen ........................ | 706/54 |
| 6,006,217 A | | 12/1999 | Lumsden ....................... | 707/2 |
| 6,009,459 A | | 12/1999 | Belfiore et al. ............. | 709/203 |
| 6,101,537 A | | 8/2000 | Edelstein et al. ........... | 709/219 |
| 6,269,361 B1 | * | 7/2001 | Davis et al. ................... | 707/3 |
| 6,336,116 B1 | * | 1/2002 | Brown et al. ................. | 707/10 |
| 6,560,634 B1 | * | 5/2003 | Broadhurst ................. | 709/203 |

FOREIGN PATENT DOCUMENTS

| WO | WO 9923581 | 5/1999 | ........... G06F/17/30 |
|---|---|---|---|

OTHER PUBLICATIONS

"Indexing and Abstracting on the World Wide Web: An Examination of Six Web Databases," Scott Nicholson, published (Secon edition copyright Feb. 27, 1997) in Jun. 1997 in Information Technology and Libraries, available at www.askscott.com, pp. 1–16.*

* cited by examiner

Primary Examiner—Hosain T. Alam
(74) Attorney, Agent, or Firm—Browning Bushman P.C.

(57) ABSTRACT

A method and system for searching the World Wide Web through a sub-root domain name agent connected to a proprietary URL within a hierarchical directory system are provided. Sub-root domain name agents are keywords or combinations of words connected as a prefix to a proprietary URL, continuously linked together in a hierarchical chain that interfaces with a searchable index directory. Within the hierarchy, sub-root domain name agents direct the user to either a hub site for refining the search or directly to a proprietary Web site.

10 Claims, 3 Drawing Sheets

SYSTEM AND METHOD FOR SEARCHING A GLOBAL COMMUNICATION SYSTEM USING A SUB-ROOT DOMAIN NAME AGENT

FIELD OF THE INVENTION

The present invention relates generally to the field of indexing and searching on a global communications system and, more particularly, to a system for indexing and searching through a server-based application, particularly using a sub-root domain name agent as a prefix attached to a proprietary universal resource locator (URL) to quickly expedite the search.

BACKGROUND OF THE INVENTION

Addressing for the World Wide Web (which may be referred to simply as "the Web") was first designed as a system of numbers which made up an IP address for connecting one server with another. For example, the designation "202.109.57.9" uniquely identified an IP address in the early Web addressing system. This system was not intuitive and thus required precise knowledge of the address that was to be viewed by a user, much as a telephone number must be known precisely in order to be connected to the proper receiver. The numerical IP address designation for Web addresses quickly gave way to the more intuitive alphanumeric system which is so familiar today. This system is referred to as IP Resolution, and greatly assists the user in recalling or searching for a desired Web site.

In common usage today, the prefix of a Web address is given by "www". Normally, the prefix "www" is followed by a string of characters which identify a host. This string of characters, separated from the prefix by a "dot" (".") generally identifies the officially registered domain name made up of no more than 23 characters. The domain names are registered today in the United States primarily by Network Solutions and other similar organizations, and by other authorized agencies around the world. Following the character string which identifies the host is an extension, which serves to identify a hierarchy, and was originally designed to identify the type of host, such as, for example, "com" for commercial businesses, "org" for non-profit organizations and the like, "net" for networks, "edu" for educational organizations, "gov" for governmental agencies, and so on. Also, countries other than the United States may be identified by the extension, such as "uk" for the United Kingdom, and so on.

Web sites often use more than one layer or page, and character strings following the site's extension may further distinguish the pages on the site, such as for example www.mysite.com/kids/art/0058/. Further, certain companies with a Web presence typically offer free hosting services to provide extended tags off the host name in order to provide an address to a site, such as for example www.tripod.com/~mysite/art. Less commonly, some Web sites, as a means to direct a user directly to a department or particular area that may or may not be a main function of the business, will apply a sub-root domain before the host and after the "www" prefix, such as www.patents.ibm.com.

All Web sites, or individual Web site pages, may be accessed through a Web browser by typing in the Universal Resource Link (URL) of the Web site in a locator bar provided by the browser. Certain areas of a Web site can be obtained by adding identifiers as the examples above. Education ("edu") sites use these identifiers more commonly than most other types of sites. For example, www.library.sp-scc.ctc.edu distinctly identifies a distinct area within this "edu" site. Web pages within a search directory may also be accessed by using the Web browser's locator. By entering a host name and a sub-root domain name agent that links to an indexed hierarchical directory, an end user may retrieve a hub site in which the end user can access information about Web sites or Web pages that pertain to his search.

Search engines and directories have typically used host suffixes as codes or identifiers to locate or query to a particular page on selected sites. Some host suffixes provide a string of characters which is as long as a small paragraph, and quickly loses its utility as a memory aid to help a user find the site. A sub-root domain name agent is a system for querying a search engine with a hierarchical directory, allowing an end user to do a search directly from the locator bar on any browser that accesses the Web.

The most common technique used by search engines is to search for metatags which match the search terms entered by a user. Metatags are specific words or terms which the host hopes will be entered by a searcher when he is looking for topics which the host provides. For example, in the www.patents.ibm.com example above, the site includes the metatag "patent(s)" so that when this term is entered in the search field, the URL for this site will be revealed by the search engine.

Unfortunately, with the proliferation of millions of Web sites, the brute force search engine technique gets slower and slower. Further, the search results may be so voluminous as to have little or no utility to the one doing the search. New, specialized search engines provide access to a predetermined sub-set of all Web addresses, but this places an additional burden on the searcher in the skill required to find the specific address that he is looking for.

Thus, there remains a need for a global search engine which is faster than is currently available, and does not eliminate certain web sites simply by subject matter. Further, the search engine should more quickly zero in on the specific topics of interest to which a search is directed.

SUMMARY OF THE INVENTION

The present invention addresses this need in the art. The system and method use the available locator bar on a Web browser as a query entry. Key search word(s), terms, or phrases, placed as prefixes to a proprietary host name (domain name/URL), link the end user directly to a hub site that suggests Web sites pertaining to the particular interest or to redefine the search.

More particularly, the present invention provides a method and system for searching the World Wide Web through a sub-root domain name agent connected to a proprietary URL within a hierarchical directory system. Sub-root domain name agents are keywords or combinations of words connected as a prefix to a proprietary URL, continuously linked together in a hierarchical chain that interfaces with a searchable index directory. Within the hierarchy, sub-root domain name agents direct the user to either a hub site for refining the search or directly to a proprietary Web site.

The server-based application, an indexed hierarchy directory system, comprises computers connected to each other by way of a communication network. Stored on the network of computers are proprietary hub sites for refining sub-root domain name agent searches and/or direct results of a search. Within this network of computers are indexed Web sites of the Internet through their unique URLs. A communication interface connected to the Internet is used for fetching Web pages from the computers in accordance with the URLs and URL links to form the results of the search. Hub sites define the search by displaying two categories in alphabetical order. The primary category, "Best Pick", is determined through established criteria. The secondary category is created from Web site submissions for indexing and also includes a grading system.

These and other features and objects of this invention will be apparent to those skilled in the art from a review of the following detailed description and the accompanying drawings.

DETAILED DESCRIPTION OF A PREFERRED EMBODIMENT

Figure 1:
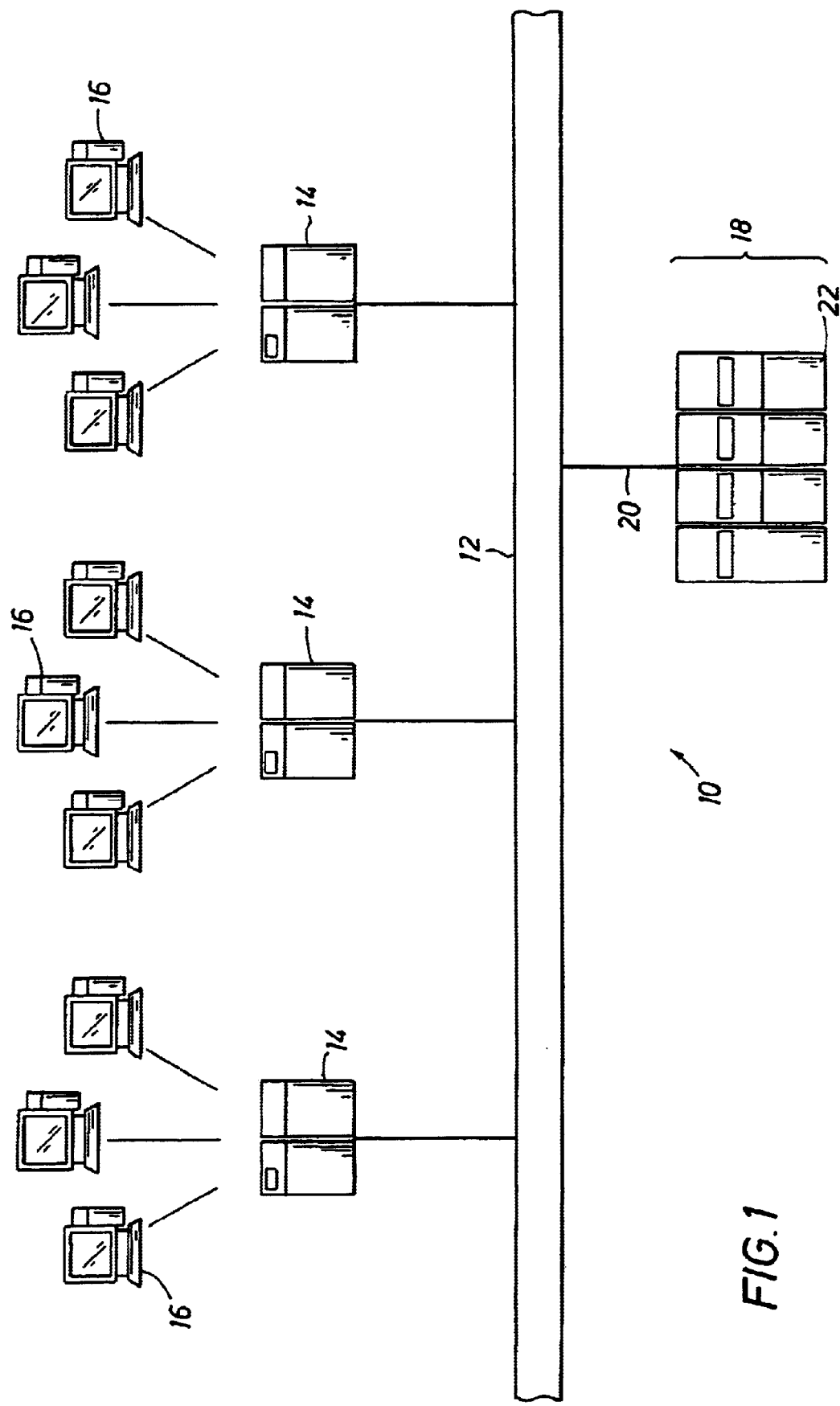
FIG. 1 is an overall system diagram of a global communication system, such as the Internet.

FIG. 1 shows an overall schematic of system 10 in which the present invention finds application. The system 10 includes a global communication system 12, such as the Internet, to which is coupled many Internet Service Providers (ISPs) 14. Each of the ISPs provides Internet access to a plurality of end users 16. Together, the ISPs provide access to the Internet for many millions of end users 16.

Figure 2:
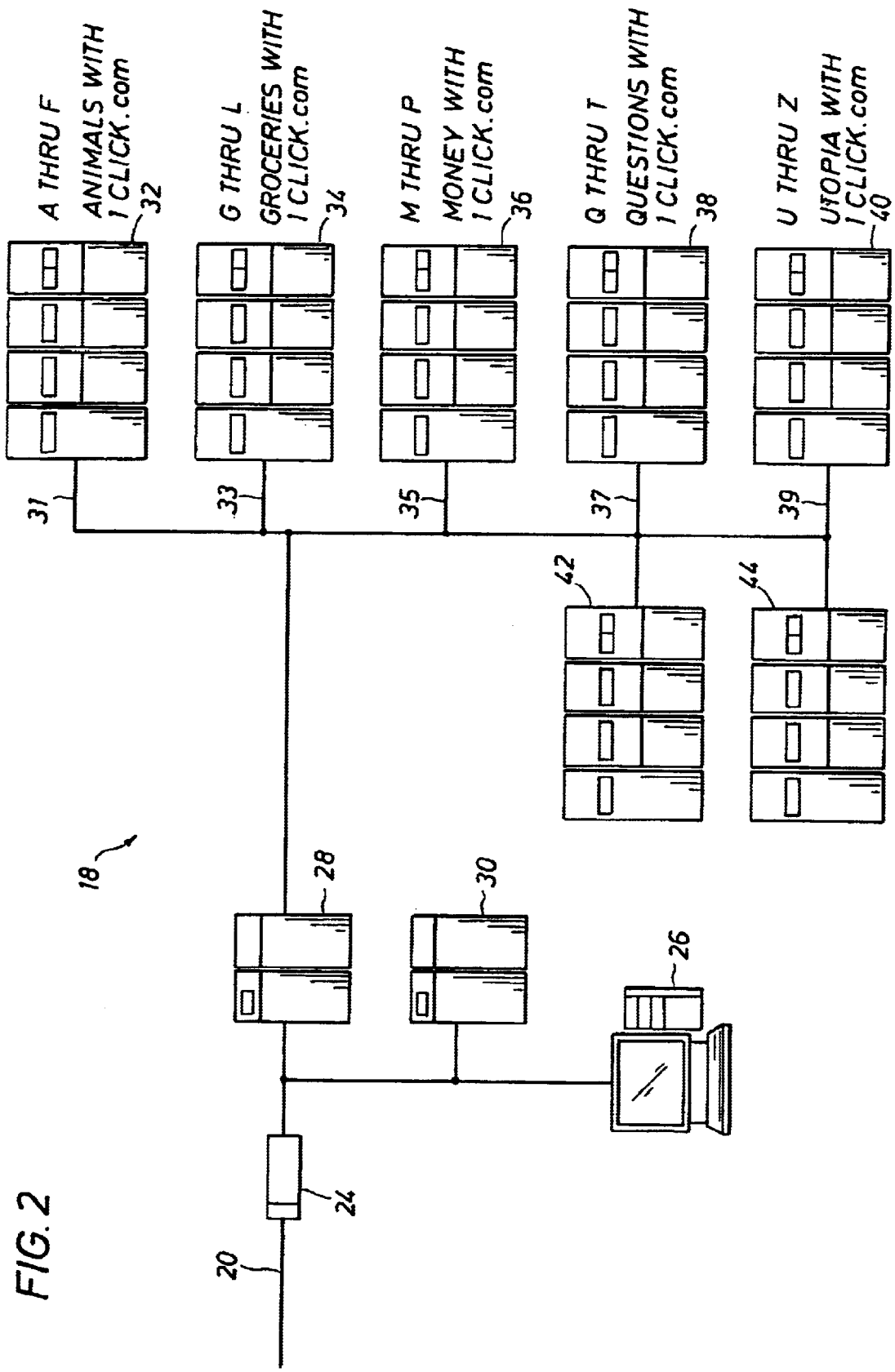
FIG. 2 is a detail schematic of the server configuration of this invention.

Also coupled to the Internet is a hub 18, wherein the present invention resides, and the hub 18 is coupled to the Internet over a high speed T-1, T-3, or other connection 20 to the Internet backbone. The hub 18 comprises a complete server system including a plurality of servers 22. The server configuration is shown in greater detail in FIG. 2.

As previously described, the hub is coupled to the Internet by way of a high speed connection 20, such as for example a T-1 or T-3 line. The connection 20 connects into a router 24 to provide Internet address connections in a manner well known in the art. The router 24 is coupled to a control terminal 26, and a pair of redundant Domain Name System (DNS) computers 28 and 30. The DNS computer 30 immediately and seamlessly assumes responsibility for domain name searching and coupling, in the event of a failure of the DNS computer 28.

Coupled to the DNS computer is a bank of servers 32, 34, 36, 38, and 40. From a different point of view, the servers may be described as a bank of processors which are ganged together to make up a single server, as seen from outside the hub 18. The servers 32 through 40 are coupled to the DNS computer 28 through respective lines 31, 33, 35, 37, and 39. The system further includes redundant mirror/backup system servers 42 and 44, in the event of a failure of any of the servers 32 through 40. Each of the servers 32 through 40 serves a different portion of the alphabet for searching purposes, such as for example A through F for server 32. In operation, a key search word, such as for example "animals", is placed as a prefix to a host name, such as for example "with1click.com", the assignee of this invention. Two or more terms as prefixes may be applied, each such term separated from an adjacent term if any by a "dot" ("."), such as for example www.fly.fishing.rod.with1click, to more narrowly define the search. Such a use is fully within the scope and spirit of this invention.

The host name serves as a domain name/URL to uniquely identify the hub 18. Upon initiation of the search the end user 16 is connected through the Internet directly to a hub 18. The data resident in the servers 32 through 40 is then searched and the user receives back certain suggestions for Web sites that pertain to the particular interest indicated by the search term. Some of the search terms entered may be inarticulately entered by the end user, and thus the servers provide assistance for related topics of interest, which would otherwise not be revealed if the search were only directed to metatags. The search results may also offer suggestions to the end user on how to redefine or refine the search.

Figure 3:
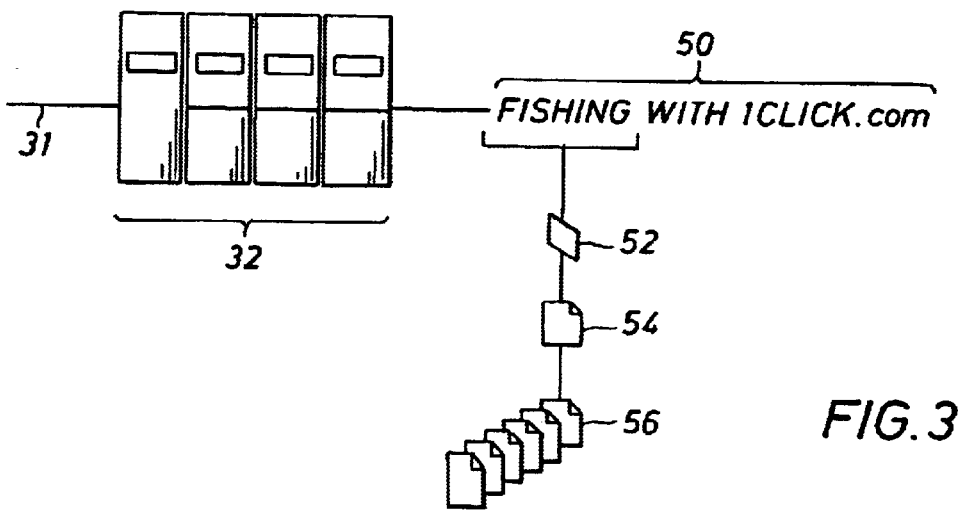
FIG. 3 is a further detail schematic showing a particular server bank to illustration the search technique of the invention.

FIG. 3 shows further details of the server configuration to illustrate how a search is carried out, including the sub-root domain name agent of this invention. As previously described, the server bank 32 is coupled to the DNS computer 28 through a line 31. Resident in the server bank 32 is a hierarchical system comprising predetermined search terms distributed into associated folders. The search comprises a prefix plus host character string 50, such as for example the term "fishing" in the example of FIG. 3. Entry of the host term automatically routes the search request to the hub 18, in a manner previously described. Once the search is directed to the hub 18, then, under the direction and control of the control terminal 26, the search is appropriately directed in the proper server 32 for this search example.

Broad terms, such as "fishing" are assigned a folder structure, such as a fishing directory 52. Directories within the servers 32 through 40, such as the fishing directory 52, include an index 54, preferably in HTM format, for the specific directory 52. The index serves as a link to specific files 56 within that directory, such as for example hypertext markup language (HTML) files used on Web, CGI scripts such as PERL, .JS files, all of which create the portal for the specific term of interest.

Figure 4:
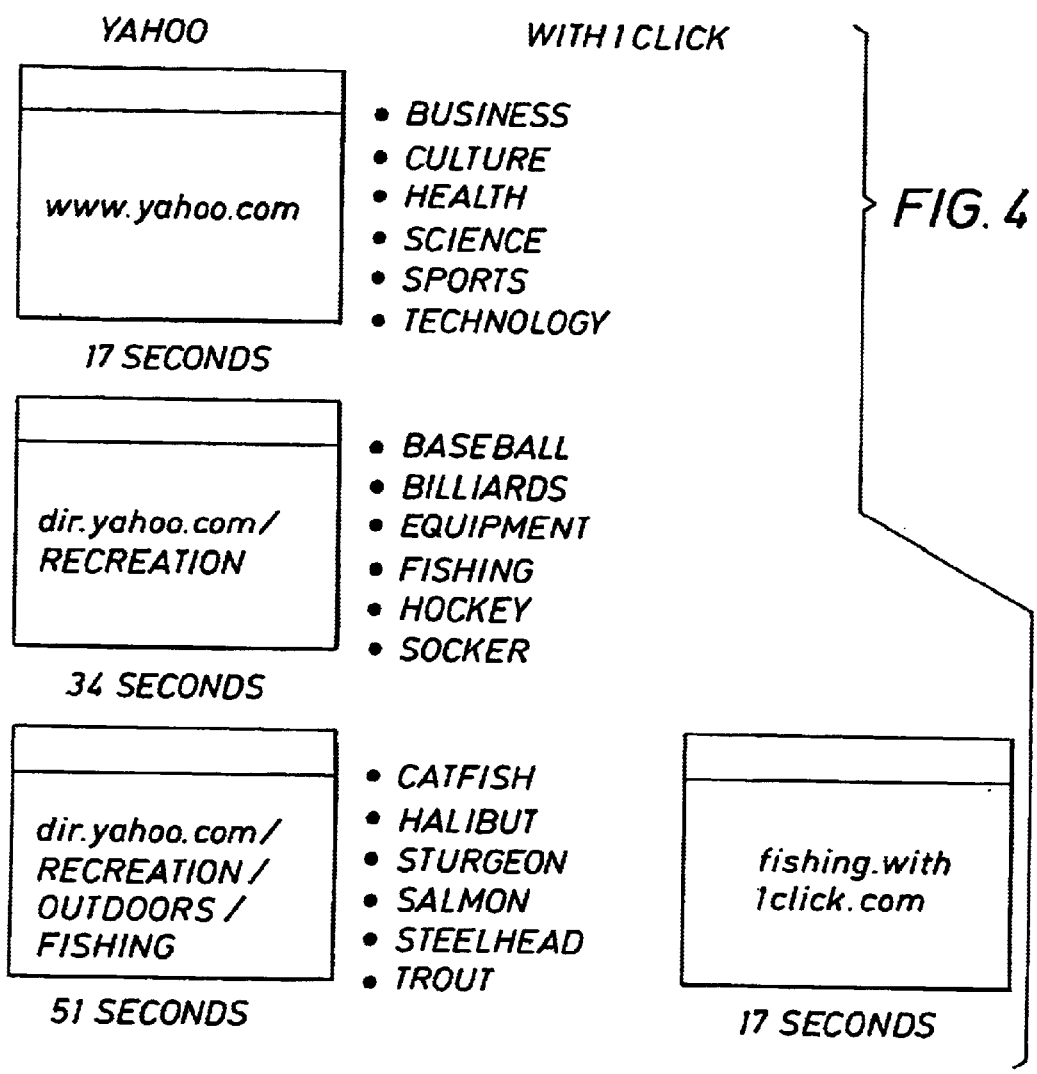
FIG. 4 is an illustration of simulated screen displays showing an exemplary search.

Finally, FIG. 4 illustrates one of the advantages of the search technique of the present invention. Assuming again the search term is "fishing," a comparison is shown with one of the more common and popular search engines from Yahoo! For the results shown, a baud rate of 28.8 K with a 2.5 kbps ratio is assumed, but faster baud rates result in similar results in relative terms. For a Yahoo! and other prior art searches, entry of the search term "fishing" directs the search engine to a category dealing generally with sports, which falls within a directory for recreation. Then, the search term further directs the search to "fishing" within the area of sports, which falls within a directory for outdoor recreation, and then to fishing. For the parameters listed above, this search requires a calculated 51 seconds. For the search technique of the present invention, the search is directed directly to the fishing directory on the server bank 32, and directly into the appropriate folder, requiring only 17 seconds.

The principles, preferred embodiment, and mode of operation of the present invention have been described in the foregoing specification. This invention is not to be construed as limited to the particular forms disclosed, since these are regarded as illustrative rather than restrictive. Moreover, variations and changes may be made by those skilled in the art without departing from the spirit of the invention.

We claim:

1. A method of revealing web site address in response to a computerized search for sites on a global communication system comprising:

a. storing a plurality of web site addresses in a hierarchical directory system on a server;

b. linking the server to the global communication system, accessible to an end user to perform the computerized search;

c. wherein the server is connected to the end user through the global communication system by way of a sub-root domain name agent, formed as combination of a prefix and a domain name, the prefix comprising a list of key search words, the domain name comprising a host name; and wherein the server further comprises a plurality of processors, each of the processors storing a subset of the alphabet for the hierarchical directory system.

2. The method of claim 1, wherein the sub-root domain name agent is developed for the end user by entering a search query on a browser search locator bar.

3. The method of claim 1, wherein the sub-root domain name agent is formed of a plurality of terms as prefixes, each such term separated from an adjacent term if any by a "dot", and a domain name.

4. A search system coupled to a global communication system, the search system comprising:

a. a server storing a hierarchical directory system;

b. means for coupling the server to the global communication system;

c. wherein the hierarchical directory system is accessible via the global communication system using a sub-root domain name agent, formed of a combination of a prefix and a domain name, the prefix comprising a list of key search words, the domain name comprising a host name; and wherein the server further comprises a plurality of processors, each of the processors storing the hierarchical directory in an alphabetically accessible structure.

5. The search system of claim 4, wherein the means for coupling the server to the global communication system comprises a router.

6. The search system of claim 4, further comprising a domain name system computer coupling the router to the server.

7. The search system of claim 4, wherein the sub-root domain name agent comprises a search term prefix appended to a universal resource locator.

8. The search system of claim 4, wherein the sub-root domain name agent comprises a plurality of search term prefixes, each such term separated from an adjacent term if any by a dot, the prefixes appended to a universal resource locator.

9. The search system of claim 4, further comprising a plurality of directories within the hierarchical directory system.

10. The search system of claim 9, further comprising an alphabetized index within each of the plurality of directories.

* * * * *